(12) United States Patent
Sidorov et al.

(10) Patent No.: US 11,630,895 B2
(45) Date of Patent: Apr. 18, 2023

(54) SYSTEM AND METHOD OF CHANGING THE PASSWORD OF AN ACCOUNT RECORD UNDER A THREAT OF UNLAWFUL ACCESS TO USER DATA

(71) Applicant: AO Kaspersky Lab, Moscow (RU)

(72) Inventors: Sergey A. Sidorov, Moscow (RU); Mikhail S. Chebakov, Moscow (RU); Irina V. Ermilova, Moscow (RU)

(73) Assignee: AO Kaspersky Lab, Moscow (RU)

( * ) Notice: Subject to any disclaimer, the term of this patent is extended or adjusted under 35 U.S.C. 154(b) by 269 days.

(21) Appl. No.: 16/431,971

(22) Filed: Jun. 5, 2019

(65) Prior Publication Data

US 2020/0210565 A1 Jul. 2, 2020

(30) Foreign Application Priority Data

Dec. 28, 2018 (RU) .......................... RU2018147238

(51) Int. Cl.
*G06F 21/45* (2013.01)
*G06F 21/55* (2013.01)

(52) U.S. Cl.
CPC ............ *G06F 21/45* (2013.01); *G06F 21/554* (2013.01); *G06F 2221/032* (2013.01)

(58) Field of Classification Search
CPC . H04L 63/1416; H04L 63/1433; G06F 21/45; G06F 21/55; G06F 21/554; G06F 21/557
See application file for complete search history.

(56) References Cited

U.S. PATENT DOCUMENTS

| | | | |
|---|---|---|---|
| 9,781,159 B1 | 10/2017 | Hernacki et al. | |
| 9,785,766 B2 | 10/2017 | Leckey et al. | |
| 9,825,934 B1 * | 11/2017 | Alexander | H04L 63/0815 |
| 10,917,400 B1 * | 2/2021 | Goings | H04L 63/20 |
| 2009/0007243 A1 | 1/2009 | Boodaei et al. | |
| 2009/0172788 A1 | 7/2009 | Vedula et al. | |
| 2012/0297484 A1 * | 11/2012 | Srivastava | G06F 21/552 726/23 |
| 2013/0263250 A1 * | 10/2013 | Leckey | G06F 21/45 726/18 |

(Continued)

FOREIGN PATENT DOCUMENTS

GB 2555384 A 5/2018

*Primary Examiner* — Dao Q Ho
(74) *Attorney, Agent, or Firm* — ArentFox Schiff LLP; Michael Fainberg (57) ABSTRACT

Disclosed herein are systems and methods for changing a password of an account record under a threat of unlawful access to user data. In one aspect, an exemplary method comprises generating, by an account records generator, a set of known user account records and sending the generated set of known user account records to a determination module, identifying, by the determination module, a use of at least one user account record from the generated set, and sending, to a verification module, data about the at least one user account record, performing, by the verification module, a verification of a presence of a threat of unlawful access to user data, the unlawful access being performed using the at least one user account record and performing, by a change module, the changing of a password of the at least one user account record the use of which has been identified.

15 Claims, 3 Drawing Sheets

(56) References Cited

U.S. PATENT DOCUMENTS

| | | |
|---|---|---|
| 2014/0337937 A1 | 11/2014 | Trukovsky et al. |
| 2017/0264611 A1* | 9/2017 | Alen .................. H04L 63/0884 |
| 2018/0357430 A1 | 12/2018 | Selgas et al. |
| 2020/0110870 A1* | 4/2020 | Girdhar ................ G06F 21/316 |

* cited by examiner

SYSTEM AND METHOD OF CHANGING THE PASSWORD OF AN ACCOUNT RECORD UNDER A THREAT OF UNLAWFUL ACCESS TO USER DATA

CROSS REFERENCE TO RELATED APPLICATIONS

The present application claims priority to Russian Patent Application No. 2018147238, filed on Dec. 28, 2018, the entire content of which is incorporated herein by reference.

FIELD OF TECHNOLOGY

The present disclosure relates to the field of computer security, more specifically, to systems and method of ensuring the security of account records and user data.

BACKGROUND

The number of people making use of the world-wide web, or Internet, is constantly increasing. Its users visit web sites and peruse their content. One of the necessary conditions for making use of the full array of services provided by web sites is the creation by the user of an account record and authorization. The account record should contain, at minimum, information about the login and password.

The more web sites the user visits and uses, the more account records he/she needs to create. Ordinarily, the user memorizes the logins and passwords of the account records for the most often used web sites, and either forgets the others or prefers to save them in one way or another. On the one hand, a careless attitude to the saving of logins and passwords of account records may result in them being compromised, and on the other hand the web site itself and its database of account records may be compromised. In either case, hackers can make use of the account records of the user to commit unlawful actions.

At present, a number of technologies are used to analyze data on compromised account records and to change their password. Even though the technologies deal with the problems of notifying the user as to the need to change a password, these technologies do not carry out the actual changing of the password upon detecting a threat, e.g., a threat to use the password, such as by a hacker.

Hence, there is a need for an effective way of protecting security of user accounts and data.

SUMMARY

Aspects of the disclosure relate to the field of security for account records and personal user data, more specifically to systems and methods for changing the password of an account record upon detection of a threat of unlawful nature. For example, the password of the user account record may be changed when an unlawful access to user account record for obtaining user data is detected.

In one exemplary aspect, a method for changing a password of an account record under a threat of unlawful access to user data is implemented in a computer comprising a hardware processor, the method comprising: generating, by an account records generator, a set of known user account records and sending the generated set of known user account records to a determination module, identifying, by the determination module, a use of at least one user account record from the generated set of known user account records, and sending, to a verification module, data about the at least one user account record the use of which has been identified, performing, by the verification module, a verification of a presence of a threat of unlawful access to user data, the unlawful access being performed using the at least one user account record, the verification being based on data about the at least one user account record, and performing, by a change module, the changing of a password of the at least one user account record the use of which has been identified, wherein the change is performed using password change rules.

According to one aspect of the disclosure, a system is provided for changing the password of an account record under a threat of unlawful access to user data, the system comprising a hardware processor configured to: generate, by an account records generator, a set of known user account records and send the generated set of known user account records to a determination module, identify, by the determination module, a use of at least one user account record from the generated set of known user account records, and send, to a verification module, data about the at least one user account record the use of which has been identified, perform, by the verification module, a verification of a presence of a threat of unlawful access to user data, the unlawful access being performed using the at least one user account record, the verification being based on data about the at least one user account record, and perform, by a change module, the changing of a password of the at least one user account record the use of which has been identified, wherein the change is performed using password change rules.

In one exemplary aspect, a non-transitory computer-readable medium is provided storing a set of instructions thereon for changing the password of an account record under a threat of unlawful access to user data, wherein the set of instructions comprises instructions for: generating, by an account records generator, a set of known user account records and sending the generated set of known user account records to a determination module, identifying, by the determination module, a use of at least one user account record from the generated set of known user account records, and sending, to a verification module, data about the at least one user account record the use of which has been identified, performing, by the verification module, a verification of a presence of a threat of unlawful access to user data, the unlawful access being performed using the at least one user account record, the verification being based on data about the at least one user account record, and performing, by a change module, the changing of a password of the at least one user account record the use of which has been identified, wherein the change is performed using password change rules.

In one aspect, the method further comprises storing the password change rules in a rules database.

In one aspect, the account records generator generates the set of known user account records by at least one of: adding user account records which the user has indicated when working with an application having a function of a password manager, analyzing data being entered in real time, the data being entered in fields designed for entry of a login and password, and analyzing a history of visited web sites, emails that contain a reference to registration on at least one web site, and user text files containing data similar to a login and password.

In one aspect, the determination module identifies the use of the at least one user account record from the generated set of known user account records by at least one of: identifying an actual use of a combination of a login and password, and by intercepting a reception of a notification as to a successful entry into an information system using an account record.

In one aspect, the identification of the actual use of the combination of the login and password comprises at least one of: ascertaining an entry of characters making up the combination of the login and password of the at least one account record from the generated set of known account records, intercepting the actions of the user when entering data containing the combination of the login and password from a clipboard, and intercepting the actions of an application with a password manager function regarding a use of the clipboard.

In one aspect, the verification of the presence of a threat of unlawful access to the user data comprises at least one of: verifying a match between a combination of login and password used when the use of the at least one user account record is identified and the combination of login and password of the information system for which the at least one user account record was created, analyzing a period of time of a web session and data of a device from which an entry was made using the combination of login and password, and identifying an unsuccessful entry on a web site using a combination of the login and password of an account record from the generated set of known account records.

In one aspect, the password change rules are based on at least one of: a period of time the user remains online, a frequency of the user remaining online, a level of importance of the account record, and a list of computer systems known to the user.

The changing of the password of an account record under a threat of unlawful access to user data in accordance with the teachings of the present disclosure improves data security. The improvement is achieved by: generating, by an account records generator, a set of known user account records and sending the generated set of known user account records to a determination module, identifying, by the determination module, a use of at least one user account record from the generated set of known user account records, and sending, to a verification module, data about the at least one user account record the use of which has been identified, performing, by the verification module, a verification of a presence of a threat of unlawful access to user data, the unlawful access being performed using the at least one user account record, the verification being based on data about the at least one user account record, and performing, by a change module, the changing of a password of the at least one user account record the use of which has been identified, wherein the change is performed using password change rules.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for changing passwords of account records under a threat of unlawful access to user data. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

An information system comprises the totality of information contained in databases and the information technologies and modules processing the information. Based on the type of the information contained in the databases, functions of the information system may be accessed with or without a prior registration and/or authorization. For example, there may or may not be a requirement for maintaining account records, as described below.

An information system the use of which requires a presence of an account record comprises an information system that allows the use of functions of the information system only after registration and authorization. In other words, the registration and authorization are facilitated using the account records.

An account record comprises a set of data about a user including at least data needed for: authentication of the user, and providing access to personal data and settings of the user.

Personal data comprises any information relating to an individual (the subject of the personal data) who is directly or indirectly identified or identifiable.

Violation of the sanctity of privacy (e.g., identity theft) includes an unlawful gathering or disseminating of information about a private life of a person, constituting personal or family secrets of the person, without consent of the person, or the disseminating of these information in a public speech, in a publicly demonstrated work, or in a mass information media.

An unlawful access to computer information, is the computer information being protected by law, may involve destruction, blocking, modification or copying of computer information, causing serious harm to the owner of the information, or using the information for gainful purposes.

The databases of account records of information systems requiring the presence of an account record for their use, such as those embodied in the form of a web site, are often subject to attacks by hackers. The attacks, planned and prepared by hackers, may result in the hacker obtaining access to user data. As such, it is advantageous to recognize the actual obtaining of access to a user account record in good time, and to carry out a changing of the password of the account record to prevent the use of the user data by the hacker.

In one aspect, the system of the present disclosure for changing the password of an account record under a threat of unlawful access to user data is used to accomplish this purpose, by recognizing the threat and carrying out the changing of the password of the account record in a timely manner in order to prevent the use of the user data by the hacker.

In one aspect, a system for changing passwords of account records under a threat of unlawful access to user data in accordance with the teachings of the present disclosure includes real-world devices, systems, components, and groups of components realized with the use of hardware such as integrated microcircuits (application-specific integrated circuit, ASIC) or field-programmable gate arrays (FPGA), or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 3). Furthermore, components of the system may be realized either within a single computing device or spread out among several interconnected computing devices.

Figure 1:
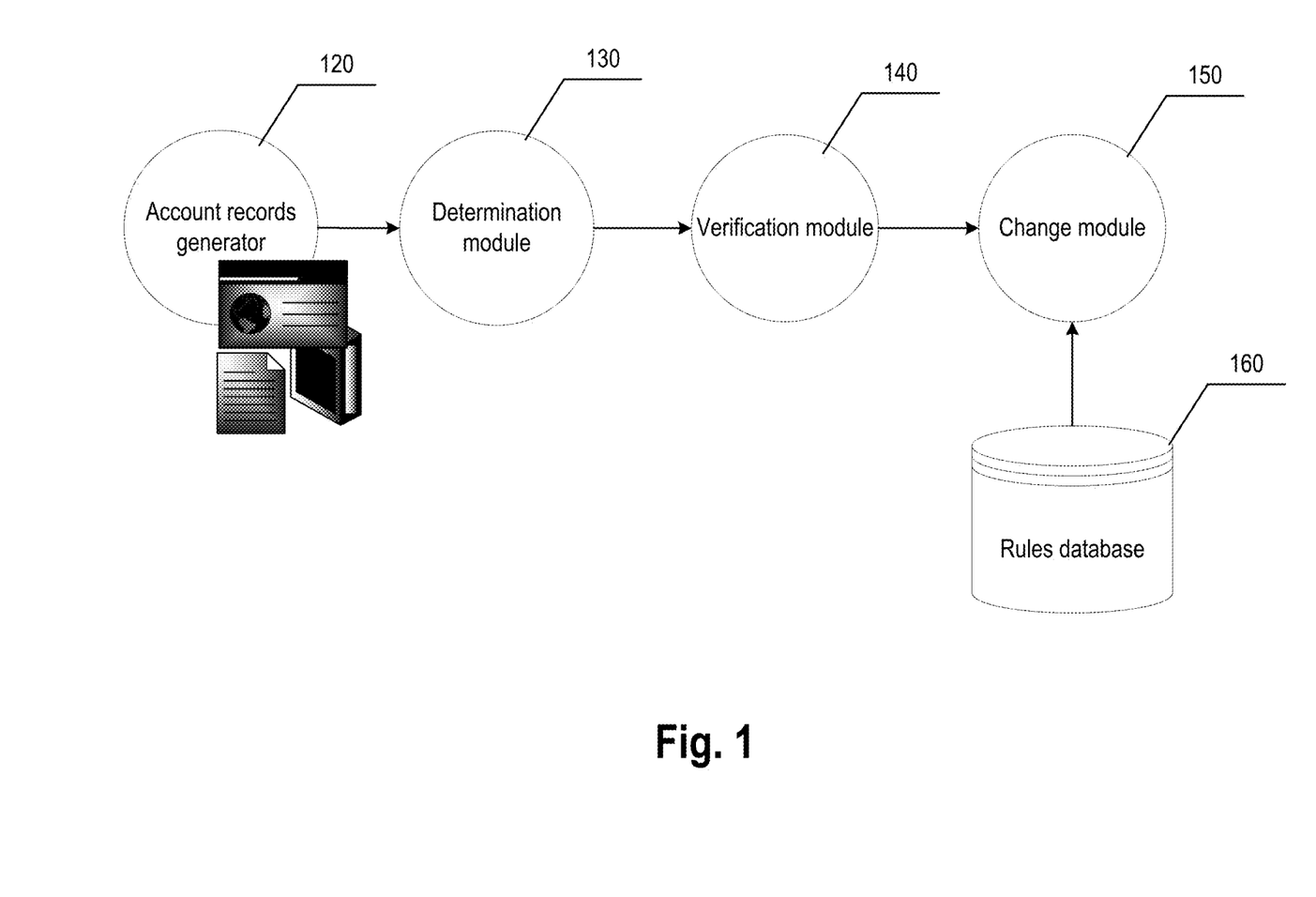
FIG. 1 is a block diagram illustrating an exemplary system for changing passwords of account records under a threat of unlawful access to user data in accordance with aspects of the present disclosure.

FIG. 1 is a block diagram illustrating an exemplary system 100 for changing passwords of account records under a threat of unlawful access to user data in accordance with aspects of the present disclosure. The system 100 for changing passwords of account records under a threat of unlawful access to user data includes account records generator 120, the determination module 130, the verification module 140, the change module 150, and the rules database 160.

The account records generator 120 is designed to generate a set of known user account records and send the generated set of known account records to a determination module 130.

The set of known user account records is the totality of account records of one user for information systems the use of which requires the presence of an account record. Table-1 shows an example of a set of known user account records. The first column may contain data with the name of the information system the use of which requires the presence of an account record for the user, such as: the name of the web site or web service, an operating system, an application or a program. In addition, other columns may be included for containing data on logins and passwords for entries in the first column. That is, the entries in the other columns correspond to respective names of the information system listed in the first column of the account record.

Besides the indicated columns, the set of known account records may contain, for example, data on a start time for indicating when the user began accessing the information system making use of the account record, data on an end time indicating when the user ended accessing the information system, start and end times of a web session or a period of time for working with the information system (e.g., the period of time for the user remaining online working with the information system), the list of information to which an access may be obtained, information about a computer system used during an authorization using the account record (e.g., unique identifier of the OS installation key, identifiers of the hard drive, MAC addresses of network devices, IP address, etc.).

TABLE 1

An Example of a Set of Known Account Records

| Information system the use of which requires presence of an account record | Login | Password |
| --- | --- | --- |
| 1234.ru | sun@somemail.com | password1 |
| Abcd.com | sun@somemail.com | password2 |
| Xyz.org | moon@othermail.com | password2 |
| 56789.com | moon@othermail.com | password1 |
| Somemail.com | sun | password3 |
| OS Windows | Usermoon | 4password |
| SomeAppAndroid | Sunuser | 5password |

In one aspect, the generating of the set of known user account records can be carried out by analyzing the user account records for authorization in information systems the use of which requires the presence of an account record, which the user has indicated when working with an application having a function of a password manager. For example, the user has installed and is using an application with a password manager function and enters data which he/she would like to be saved in the password manager database. Then, the generation of the set of user account records may comprise: performing an analysis of the account records in the password manager database, and adding the account records from the password manager database to generate the set of user account records.

In another aspect, the generating of the set of known account records can be carried out by: analyzing information systems visited by the user, wherein the visited information systems require a presence of an account record for the user; and by intercepting data being entered, e.g., in real time mode. For example, the user may visit a web site and enter a login and a password. The visiting of the web site and the entering of data may be intercepted and analyzed. If the entry is successful, the intercepted data can be added to the set of known account records.

In another aspect, the set of known user account records can be generated by analyzing a history of visits, for example to web sites, and by identifying emails in the user's mailboxes containing the fact of registration on the web sites. For example, the web sites, upon registration, may duplicate the data entered about the user, especially the login and password, and send an email to an indicated email address of the user. In addition, a search and analysis can be done for text files on computer systems of the user to identify data or records similar to a login and password, which the user has saved. The identified data or record may be used to generate the set of known account records.

The determination module 130 is designed to identify a use of at least one user account record from the generated set of known user account records and send data about the user account record which has been identified as being used to a verification module 140.

In one aspect, the identification of the use of the at least one user account record from the generated set of known user account records comprises: identifying the actual use of a combination of a login and a password. Note that if a user enters the login and password from any given account record, this implies that he/she intends to make use of the entered login and password afterwards.

In one aspect, the identification of the actual use of the combination of the login and the password from the generated set of known user account records comprises ascertaining an entry of characters making up the combination of the login and password. For example, the identification of the actual use may be made when the user enters data with the aid of an entry device (e.g., a keyboard) or a data entry application (e.g., a virtual keyboard).

In another aspect, the identification of the actual use of the combination of the login and password of an account record from the generated set of known account records comprises: intercepting actions of the user when entering data containing the combination of the login and password from a clipboard. For example, the user may have opened an email from a web site containing the login and password of the account record, copied the data, and pasted it in the appropriate lines. If the data that is pasted in matches the data from the generated set of known account records, the actual use of the combination of login and password may be considered as being identified. In other words, the pasting in of the combination of the login and password may be treated as an actual use of the combination of the login and password.

In yet another aspect, the identification of the actual use of the combination of the login and password comprises: intercepting actions of an application with a password manager function by using a clipboard in a special mode. For example, the application with the password manager function may be set up in such a way that, when the user accesses a particular web site, the application automatically pastes a corresponding combination of login and password into necessary fields. In this case, the application with the password manager function uses the clipboard in a special mode, in which the time for saving data in the clipboard may be restricted, for example. If the data pasted in by the application with the password manager function matches up with the data from the set of known account records, the actual use of the corresponding combination of the login and password may be considered as being identified.

In one aspect, the identification of the use of at least one user account record from the generated set of known user account records comprises: intercepting a reception of a notification as to a successful entry into an information system via an account record. For example, the settings of popular email services (e.g., Google, Yandex, Mail, etc.) may provide an option for activating the aforesaid notifications.

The verification module 140 is designed to: receive the data about the user account record from the determination module 130, perform a verification of the presence of a threat of unlawful access to user data using the account record identified as being used based on the data about the user account record, and send a result of the verification to a change module 150.

In one aspect, the threat of unlawful access to the user data comprises an unauthorized entity, e.g., a hacker, obtaining access to the user data, e.g., personal user data, and using the user data obtained without authorization for at least one malicious purpose. For example, the hacker may have gained possession of information as to the active login and password of a particular user account record.

In one aspect, the verification of the presence of the threat of unlawful access comprises: verifying a match between the combination of login and password used when the use of the at least one user account record is identified and the combination of login and password of the information system for which the user account record was created. From the entered combination of login and password, it is known which account record was used and for which information resource the combination is used. If the name of the information system does not match the used combination of login and password, it is possible that the user has been the victim of a phishing attack. For example, the user has entered the login and password of an account record for a social network on a malicious web site which is visually similar to the web site of the social network. Then, a threat for unlawful access to the user data arises.

In another aspect, the verification of the presence of the threat of unlawful access to the user data comprises: analyzing a period of time of a web session and data of a computer system from which an entry was made using the combination of the login and password. In this case, the presence of a different time of the web session or a different computer system from which the entry was made using the combination of the login and password is an indicator of a threat of unlawful access to the user data. Information as to the time of the web session and the data regarding the computer system from which the entry was made using the combination of the login and password can be obtained, for example, from the web site where the entry was made.

In yet another aspect, the verification of the threat of unlawful access to the user data comprises: identifying an unsuccessful entry on an information resource, such as a web site, using a combination of login and password of an account record from the generated set of known account records. Such a situation may occur when data about a user and his/her account record have become known to a hacker, for example, as a result of a successful attack on the database of account records of an information system. In this case, the hacker may not have enough time to utilize the data obtained about the user, or not have a specific plan on how to use it, and may simply alter the password in order to return to this account record later on. Repeated entry using an account record from the set of known account records, if unsuccessful, may allow the threat of unlawful access to the user data to be identified.

In another aspect, the verification of the presence of the threat of unlawful access to the user data comprises: performing periodic analysis of databases containing information on current hacking of security systems of various information systems. For example, the databases of such web sites as haveibeenpwned.com, contain compromised passwords and logins. Once the verification of the presence of the threat of unlawful access is performed via one or more of the above aspects, if the threat is present, the verification module 140 sends the results of the verification to the change module 150. If no threat is present, the password of the account record is not to be changed.

The change module 150 is designed to: change the password of the at least one identified user account record. The changing of the password is performed in accordance with password change rules, the password change rules providing one or more rules for changing passwords when the threat of unlawful access to the user data through account records is identified. In one aspect, the password change rules are obtained from a rules database 160.

In one aspect, a password change rule includes a set of conditions upon being fulfilled, the change module 150 performs the changing of the password of the at least one identified user account record. The threat of unlawful access to the user data is revealed while using the at least one identified account record. The password change rules may be based on a period of time the user remains online, a frequency of the user remaining online, a level of importance of the account record, a list of computer systems known to the user, and so forth.

The period of time the user remains online includes: a period of time between entering the information system using an account record and leaving the information system, or a period of time between a start (resumption) of a web session using the account record and a termination of the web session. In one aspect, the period of time the user remains online may further be counted based on instances of using the account record.

The frequency of the user remaining online includes a number of periods of time the user remains online in a given period of time (e.g., a day, a week, a month, etc.).

The list of computer systems known to the user is a list of trusted computer systems that were used to enter an information system using the account record.

In one aspect, the level of importance of the account record signifies that the account record is important when the account record is a basis for forming another account record. For example, suppose a user has created an account record in an information system the use of which requires the presence of an account record and which provides email services. In addition, suppose there is an information system the use of which requires the presence of an account record, where the login of the account record contains the name of a mailbox, such as an Internet store. Then, the account record of the mailbox may be the basis for forming the account record for the Internet store.

In another example, email and mailbox services are provided by an email service provided through the web site www.somemail.com. An account record is created for entering the website with a login, "sun", and a password, "password3". The Internet store abcd.com provides services when an account record exists, where the login may indicate a working mailbox and any desired password. Accordingly, the user indicates sun@somemail.com and password2. Thus, the account record for the email service is important. This same category may contain, for example, the account record of a mailbox when creating a new mailbox in a different information system, for example, creating a new Google mailbox and indicating an additional Yandex mailbox.

In one aspect, an important account record can be an account record of which the frequency of remaining online is more than 2 times a day. For example, the user has created an account record in an information system the use of which requires the presence of an account record, and enters the combination of login and password or continues a previously exited web session more than 2 times a day. This implies that the user is exchanging current information with the use of said account record. For example, this is an account record for a social network.

In another aspect, an important account record can be an account record which can be used to obtain access to personal user data, including data allowing the performing of actions having financial consequences. One example may be an account record for an online banking, a social network, or a gateway for government services.

In one example, the password change rules may include the following set of conditions: a detection of the use of an account record of any given importance, and the combination of login and password failing to match with the login and password of the information system for which the account record was created. If this set of conditions is met, the password of the account record is changed. This rule will operate, for example, when the user has entered a login and password on a web site which was created by a hacker and is similar to the web site for which the account record was created.

Another example of a password change rule may include the following set of conditions: a detection of the use of an account record of any given importance, the period of time the user remains online is more than 2 times a day, and the next entry is made from a previously unknown computer system. If this set of conditions is met, the password of the account record is changed. This rule will operate in the case when a hacker has gained possession of a login and password from an account record, or was able to seize control of a web session and has gained entry. A promptly changed password can halt the threat of unlawful access to user data.

Yet another example of a password change rule may include the following set of conditions: a detection of the use of an important account record, the frequency of the user remaining online is less than 3 times a week, repeated entry using an account record from the set of known account records is not possible. If this set of conditions is met, the password of the account record is changed. This rule will operate in the case when a hacker has gained possession of a login and password from an account record and has altered the password, for example, in order to demand ransom.

A further example of a password change rule may include the following set of conditions: a detection of the use of an account record of any given importance, and the password of the account record matches the password of an important account record. Repeated entry using the account record the use of which was identified is not possible. If this set of conditions is met, the password of the important account record the use of which was identified is changed. This rule will operate in the case when a hacker has gained possession of a login and password from an account record which has no special importance, yet given the matching of the passwords with an important account record, it may yet signify a threat of unlawful access to user data.

In an additional aspect, when the need arises, password change rules may be used to determine a schedule of interim, repeat, or spot checks to be performed by the verification module 140.

In one aspect, to perform said actions for determining the schedule of checks, the account records generator 120, the determination module 130, the verification module 140, and the change module 150 may launch an antivirus program or its individual modules. For example, one of the modules may be realized in the form of an extension for a web browser, a web application with a data entry intercept function, a program for mobile, stationary, or server OS, contain password manager functions, and so forth. In another aspect, a protocol or algorithm may be used for an emergency password change, directly describing the interaction of the system for changing the password of an account record under a threat of unlawful access to the user data and a particular information system the use of which requires the presence of an account record. The protocol or algorithm enable changing of the password of the account record, in an urgent situation, without the involvement of the user. Such a protocol may be designed, for example, similar to a system for unsubscribing from mailings.

In one aspect, the rules database 160 is designed to store password changing rules. Various kinds of databases may be used as the rules database 160, namely: hierarchical (IMS, TDMS, System 2000), network (Cerebrum, Cronospro, DBVist), relational (DB2, Informix, Microsoft SQL Server), object-oriented (Jasmine, Versant, POET), object-relational (Oracle Database, PostgreSQL, FirstSQL/J), functional, and so forth. In one aspect, the rules database 160 may be supplemented or updated with the aid of an antivirus server.

Figure 2:
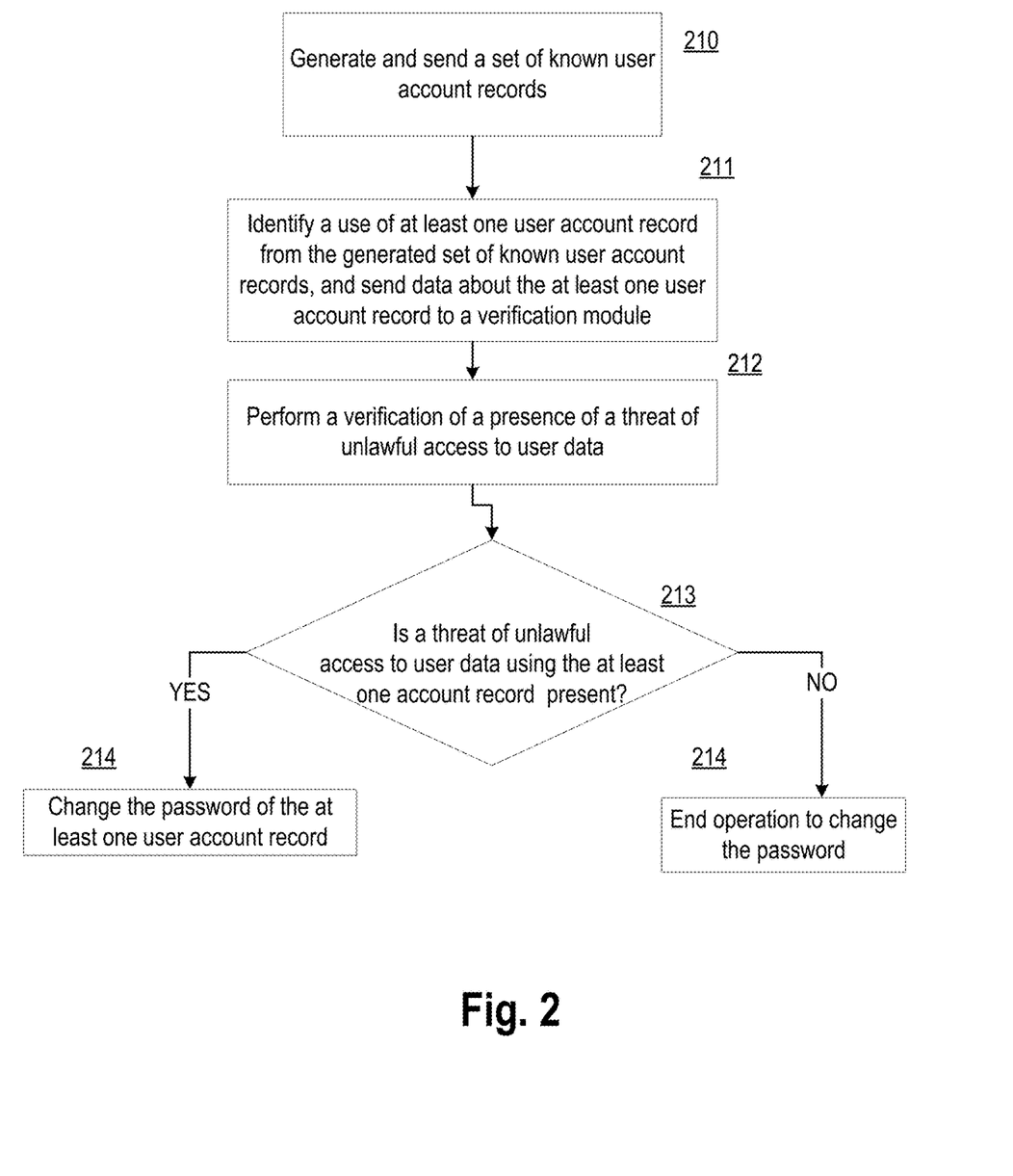
FIG. 2 is a flow diagram illustrating an exemplary method for changing passwords of account records under a threat of unlawful access to user data.

FIG. 2 is a flow diagram illustrating an exemplary method 200 for changing passwords of account records under a threat of unlawful access to user data.

In step 210, method 200, by the account records generator 120, generates a set of known user account records and sends the generated set of known user account records to the determination module 130.

In step 211, method 200, by the determination module 130, identifies a use of at least one user account record from the generated set of known user account records, and sends, to the verification module 140, data about the at least one user account record the use of which has been identified.

In step 212, method 200, by the verification module 140, performs a verification of a presence of a threat of unlawful access to user data, the unlawful access being performed using the at least one user account record, and the verification being based on data about the at least one user account record.

In step 213, method 200, determines whether or not a threat of unlawful access to user data using the at least one account record is present. If no threat is present, the method proceeds to step 215. If a threat of unlawful access to user data using the at least one account record is present, the method, by the verification module 140, sends the results of the verification to the change module 150 and proceeds to step 214.

In step 214, method 200, by the change module 150, performs the changing of the password of the at least one user account record the use of which has been identified, wherein the change is performed using password change rules. In one aspect, the password change rules are obtained from the rules database 160.

In step 215, method 200 ends the operation to change the password of the at least one user account record.

In one aspect, a system is provided for changing the password of the account record under a threat of unlawful access to user data, the system comprising: an account records generator, a determination module, a verification module, and a change module, wherein the account records generator generates a set of known user account records and sends the generated set of known user account records to the determination module, the determination module identifies a use of at least one user account record from the generated set of known user account records, and sends, to the verification module data about the at least one user account record the use of which has been identified, the verification module performs a verification of a presence of a threat of unlawful access to user data, the unlawful access being performed using the at least one user account record, and the verification being based on data about the at least one user account record; and the change module performs the changing of the password of the at least one user account record the use of which has been identified, wherein the change is performed using password change rules.

In one aspect, the system for changing the password further comprises: a rules database for storing the password changing rules.

In one aspect, the account records generator generates the set of known user account records by adding user account records which the user has indicated when working with an application having a function of a password manager.

In one aspect, the account records generator generates the set of known user account records by analyzing data being entered in real time, the data being entered in fields designed for entry of a login and password.

In one aspect, the account records generator generates the set of known user account records by analyzing a history of visited web sites, emails that contain a reference to registration on at least one web site, and user text files containing data similar to a login and password.

In one aspect, the determination module identifies the use of the at least one user account record from the generated set of known user account records by: identifying an actual use of a combination of a login and password, or by intercepting a reception of a notification as to a successful entry into an information system using an account record.

In one aspect, the identification of the actual use of the combination of the login and password comprises: ascertaining an entry of characters making up the combination of the login and password of the at least one account record from the generated set of known account records.

In one aspect, the identification of the actual use of the combination of the login and password comprises: intercepting the actions of the user when entering data containing the combination of the login and password from a clipboard.

In one aspect, the identification of the actual use of the combination of the login and password comprises: intercepting the actions of an application with a password manager function regarding a use of the clipboard.

In one aspect, the verification of the presence of a threat of unlawful access to the user data comprises: verifying a match between a combination of login and password used when the use of the at least one user account record is identified and the combination of login and password of the information system for which the at least one user account record was created.

In one aspect, the verification of the presence of a threat of unlawful access to the user data comprises: analyzing a period of time of a web session and data of a device from which an entry was made using the combination of login and password.

In one aspect, the verification of the presence of a threat of unlawful access to the user data comprises: identifying an unsuccessful entry on a web site using a combination of the login and password of an account record from the generated set of known account records.

Figure 3:
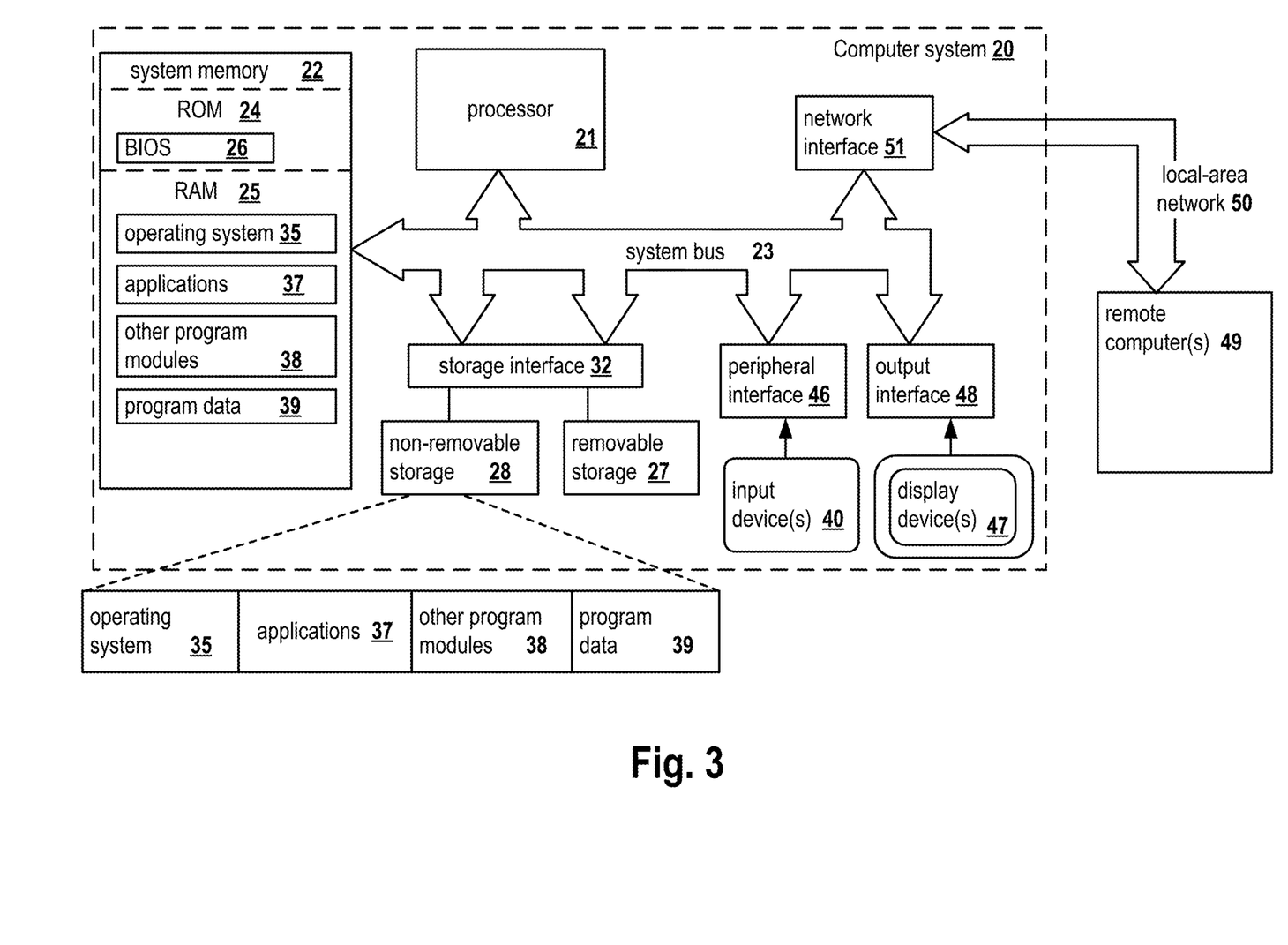
FIG. 3 presents an example of a general-purpose computer system on which aspects of the present disclosure can be implemented.

FIG. 3 is a block diagram illustrating a computer system 20 on which aspects of systems and methods for changing passwords of account records under a threat of unlawful access to user data may be implemented in accordance with an exemplary aspect. It should be noted that the computer system 20 can correspond to a virtual machine on a computing device, for example, as described earlier, the system, comprising a processor for performing the functions of the account records generator, the determination module, the verification module, the change module, etc., may be deployed on a virtual machine. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I$^2$C, and other suitable interconnects. The central processing unit 21 (also referred to as a processor) can include a single or multiple sets of processors having single or multiple cores. The processor 21 may execute one or more computer-executable code implementing the techniques of the present disclosure.

The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting a user account from unlawful access, the method comprising:
generating, by a hardware processor, a set of user account records;
determining, by the hardware processor, whether the user account has been accessed and collecting data about the accessed user account,
determining by the hardware processor, whether an unlawful access was performed to the user account, by analyzing the collected data including a period of time of a web session and device information from which the user account has been accessed; and
changing, by the hardware processor, a password of the user account, in response to detecting unlawful access to the user account, wherein the change is performed using password change rules, wherein the password change rules are based on: a frequency of the user remaining online, wherein the frequency of the user remaining online includes a number of periods of time the user remains online in a given period of time, and wherein the password change rules include at least a password change rule configured to trigger a password change of a second user account different from the user account associated with the unlawful access when the password of the second user account matches the password of the user account associated with the unlawful access and when the second user account has the frequency of the user remaining online that exceeds a predetermined threshold.

2. The method of claim 1, further comprising:
storing the password change rules for changing the password in a rules database.

3. The method of claim 1, wherein the hardware processor generates the set of user account records by at least one of:
analyzing data being entered in real time, the data being entered in fields designed for entry of a login and password; and
analyzing a history of visited web sites, emails that contain a reference to registration on at least one web site, and user text files containing data similar to a login and password.

4. The method of claim 1, wherein the hardware processor determines whether the user account record has been accessed by:
identifying an actual use of a combination of a login and password; and
intercepting a reception of a notification as to a successful entry into an information system using an account record.

5. The method of claim 4, wherein the identification of the actual use of the combination of the login and password comprises at least one of:
ascertaining an entry of characters making up the combination of the login and password of the at least one account record from the generated set of account records;
intercepting the actions of the user when entering data containing the combination of the login and password from a clipboard; and
intercepting the actions of an application with a password manager function regarding a use of the clipboard.

6. A system for protecting a user account from unlawful access, comprising:
at least one hardware processor configured to:
generate a set of user account records;
determine whether the user account record has been accessed and collect data about the accessed user account;
determine whether an unlawful access was performed to the user account, by analyzing the collected data including a period of time of a web session and device information from which the user account has been accessed; and
change a password of the user account, in response to detecting unlawful access to the user account, wherein the change is performed using password change rules, and wherein the password change rules are based on a frequency of the user remaining online, wherein the frequency of the user remaining online includes a number of periods of time the user remains online in a given period of time, and wherein the password change rules include at least a password change rule configured to trigger a password change of a second user account different from the user account associated with the unlawful access when the password of the second user account matches the password of the user account associated with the unlawful access and when the second user account has the frequency of the user remaining online that exceeds a predetermined threshold.

7. The system of claim 6, the at least one processor further configured to:
store the password changing rules for changing the password in a rules database.

8. The system of claim 6, wherein the at least one hardware processor configured to generate the set of user account records is further configured to at least one of:
analyze data being entered in real time, the data being entered in fields designed for entry of a login and password; and
analyze a history of visited web sites, emails that contain a reference to registration on at least one web site, and user text files containing data similar to a login and password.

9. The system of claim 6, wherein the at least one hardware processor configured to determine whether the user account record has been accessed is further configured to:
identify an actual use of a combination of a login and password; and
intercept a reception of a notification as to a successful entry into an information system using an account record.

10. The system of claim 9, wherein the at least one hardware processor configured to identify the actual use of the combination of the login and password is further configured to at least one of:
ascertain an entry of characters making up the combination of the login and password of the at least one account record from the generated set of account records;
intercept the actions of the user when entering data containing the combination of the login and password from a clipboard; and
intercept the actions of an application with a password manager function regarding a use of the clipboard.

11. A non-transitory computer readable medium storing thereon computer executable instructions for protecting a user account from unlawful access, including instructions for:
generating, by hardware processor, a set of user account records;
determining, by the hardware processor, whether the user account has been accessed and collecting data about the accessed user account;
determining, by the hardware processor, whether an unlawful access was performed to the user account, by analyzing the collected data including a period of time of a web session and device information from which the user account has been accessed; and
changing, by the hardware processor, a password of the user account, in response to detecting unlawful access to the user account, wherein the change is performed using password change rules, and wherein the password change rules are based on a frequency of the user remaining online, wherein the frequency of the user remaining online includes a number of periods of time the user remains online in a given period of time, and wherein the password change rules include at least a password change rule configured to trigger a password change of a second user account different from the user account associated with the unlawful access when the password of the second user account matches the password of the user account associated with the unlawful access and when the second user account has the frequency of the user remaining online that exceeds a predetermined threshold.

12. The non-transitory computer readable medium of claim 11, further comprising instructions for storing the password change rules for changing the password in a rules database.

13. The non-transitory computer readable medium of claim 11, the instructions for generating the set of user account records comprising instructions for at least one of:
analyzing data being entered in real time, the data being entered in fields designed for entry of a login and password; and
analyzing a history of visited web sites, emails that contain a reference to registration on at least one web site, and user text files containing data similar to a login and password.

14. The non-transitory computer readable medium of claim 12, the instructions for determining whether the user account record has been accessed comprising instructions for:
identifying an actual use of a combination of a login and password; and
intercepting a reception of a notification as to a successful entry into an information system using an account record.

15. The non-transitory computer readable medium of claim 14, the instructions for identifying the actual use of the combination of the login and password comprising instructions for at least one of:
ascertaining an entry of characters making up the combination of the login and password of the at least one account record from the generated set of account records;
intercepting the actions of the user when entering data containing the combination of the login and password from a clipboard; and
intercepting the actions of an application with a password manager function regarding a use of the clipboard.

* * * * *